US012342433B2

(12) United States Patent
Taleb

(10) Patent No.: US 12,342,433 B2
(45) Date of Patent: Jun. 24, 2025

(54) METHOD FOR OPERATING AN AUTOMOTIVE LIGHTING DEVICE

(71) Applicant: VALEO VISION, Bobigny (FR)

(72) Inventor: Rabih Taleb, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/567,865

(22) PCT Filed: Jun. 22, 2022

(86) PCT No.: PCT/EP2022/067009

§ 371 (c)(1),
(2) Date: Dec. 7, 2023

(87) PCT Pub. No.: WO2022/268879

PCT Pub. Date: Dec. 29, 2022

(65) Prior Publication Data

US 2024/0284568 A1 Aug. 22, 2024

(30) Foreign Application Priority Data

Jun. 23, 2021 (FR) ...................................... 2106722
Jun. 23, 2021 (FR) ...................................... 2106724

(51) Int. Cl.
*H05B 45/18* (2020.01)
*F21S 41/153* (2018.01)
(Continued)

(52) U.S. Cl.
CPC ............ *H05B 45/28* (2020.01); *F21S 41/153* (2018.01); *F21S 43/14* (2018.01); *H05B 45/18* (2020.01); *H05B 45/325* (2020.01); *H05B 45/56* (2020.01)

(58) Field of Classification Search
CPC ........ H05B 45/18; H05B 45/28; H05B 45/56; H05B 45/58; H05B 47/105; H05B 47/115;
(Continued)

(56) References Cited

U.S. PATENT DOCUMENTS 8,704,461 B2 * 4/2014 Ishii .................. H05B 45/3725 315/307
10,290,264 B2 5/2019 Ghoshal et al.
(Continued)

FOREIGN PATENT DOCUMENTS

DE 102015009736 A1 7/2016
EP 2273851 A2 1/2011

OTHER PUBLICATIONS

European Patent Office, International Search Report and Written Opinion of corresponding International Application No. PCT/EP2022/067009, dated Aug. 31, 2022.

*Primary Examiner* — Tung X Le
(74) *Attorney, Agent, or Firm* — Valeo Vision

(57) ABSTRACT

A method for operating an automotive lighting device including at least one solid-state light source. The method includes defining a color allowance condition, feeding the light source with a current value which produces a luminous flux value higher than a minimum luminous flux threshold value, measuring the temperature in the light source, checking whether the output color satisfies the allowance condition and increasing or decreasing the current value, always keeping the current such as it produces an acceptable color. With the checking includes perform a pulse width modulation of the current value to keep an average value of the current which produces a luminous flux value higher than the minimum luminous flux threshold value. The invention
(Continued)

also provides an automotive lighting device comprising a control element to carry out the steps of this method.

16 Claims, 4 Drawing Sheets

(51) Int. Cl.
*F21S 43/14* (2018.01)
*H05B 45/28* (2020.01)
*H05B 45/325* (2020.01)
*H05B 45/56* (2020.01)

(58) Field of Classification Search
CPC .. H05B 47/155; B60Q 1/0408; B60Q 1/1407; B60Q 1/1423; B60Q 2300/42; B60Q 2300/112; B60Q 2300/314
See application file for complete search history.

(56) References Cited

U.S. PATENT DOCUMENTS

| | | | | |
|---|---|---|---|---|
| 11,338,722 | B2 | 5/2022 | Schellinger | |
| 2009/0302781 | A1* | 12/2009 | Peker | H05B 45/22 315/297 |
| 2011/0309746 | A1 | 12/2011 | Eckel et al. | |
| 2014/0035472 | A1* | 2/2014 | Raj | H05B 45/22 315/297 |
| 2016/0338165 | A1* | 11/2016 | Zhai | H05B 45/18 |
| 2019/0075632 | A1 | 3/2019 | Isele et al. | |

* cited by examiner

METHOD FOR OPERATING AN AUTOMOTIVE LIGHTING DEVICE

TECHNICAL FIELD

This invention is related to the field of automotive lighting devices, and more particularly, to the color management of these light sources comprised in these devices.

BACKGROUND OF THE INVENTION

Digital lighting devices are being increasingly adopted by car makers for middle and high market products.

These digital lighting devices usually comprise solid-state light sources, the operation of which heavily depends on temperature.

Temperature control in these elements is a very sensitive aspect, and is usually carried out by derating, which means decreasing the current value which feeds the light source so that the output flux and the operation temperature decreases accordingly. This causes that the performance of the light sources must be heavily oversized to face these overheating problems, so that the operation values may be decreased while still maintaining acceptable values.

Further, these techniques also affect the color of the output pattern. This makes that, in some cases, for some temperature ranges, output color may be out of regulations.

This problem has been assumed until now, but a solution therefor is provided.

BRIEF SUMMARY OF THE INVENTION

The invention provides an alternative solution for managing the output color of the light source patterns by a method for operating an automotive lighting device and an automotive lighting device.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a method for operating an automotive lighting device comprising at least one solid-state light source, the method comprising the steps of:

- defining a color allowance condition, wherein for each pair temperature-electrical current, a color is defined to be acceptable or not acceptable;
- establishing a minimum luminous flux threshold value and a maximum luminous flux threshold value
- feeding the solid-state light source with a current value which produces a luminous flux value comprised between the minimum luminous flux threshold value and the maximum luminous flux threshold value;
- measuring or estimating the temperature in the light source;
- obtaining the color of the light emitted by the solid-state light source based on the measured or estimated temperature and on the current value fed to the light source;
- checking whether the obtained color satisfies the allowance condition;
- if the obtained color fails to satisfy the allowance condition, increasing or decreasing the current value to produce a color which satisfies the allowance condition;
- if the increased or decreased current value produces a luminous flux value below the minimum luminous flux threshold value or above the maximum luminous flux threshold value, perform a pulse width modulation of the current value to produce a luminous flux value comprised between the minimum luminous flux threshold value and the maximum flux threshold value.

The term "solid state" refers to light emitted by solid-state electroluminescence, which uses semiconductors to convert electricity into light. Compared to incandescent lighting, solid-state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the lifespan of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

The color allowance condition is defined by means of datasheets and/or experimental data. For two given values of current and temperature, the output color of the light source may be obtained. This obtained color may be within the regulations or not, since the regulations also provide a range of accepted and unaccepted colors. Hence, a pair current-temperature is considered to fulfil the allowance condition or not.

By means of this method, the light source is able to calculate if the output color is allowed or not, and may react to a non-allowed situation by modifying the feeding current, so that the color is always kept within the allowed zone.

In the event the current level needed to keep the color within the allowance condition provides a luminous flux which is out of the limit established by the minimum and maximum luminous flux threshold values, the invention provides a solution for this problem, which comprises performing a pulse width modulation on the current value, to obtain a different average value of the current, which would lead to a different luminous flux. Indeed, the luminous flux is derived directly from the average value of the current.

In some particular embodiments, the step of obtaining the color is carried out using a datasheet and/or experimental data, which provides the color from the temperature and the current value.

There are many alternative ways of obtaining the output color of the light source. Sometimes, manufacturer's datasheets provide reliable and useful information about these parameters, but experimental data may also be used to obtain this allowance condition.

In some particular embodiments, the method further comprises the step of establishing a maximum luminous flux threshold value and the method includes keeping the average value of the current such as it produces a luminous flux value lower than the maximum luminous flux threshold value.

A maximum flux value is also useful to limit the luminous flux within the regulations.

In some particular embodiments, the step of measuring the solid-state light source temperature is carried out by a thermistor, such as a negative temperature coefficient thermistor. In different embodiments, this temperature is estimated by other means, such as using datasheets, identification or AI techniques.

A thermistor is a common element which may be employed to measure a temperature, thus providing a reliable starting point for this method.

In some particular embodiments, the step of increasing the current value involves increasing the current value from the current value to an increased current value being greater than 1.2 times the current value.

In these examples, the intensity may be increased in high ranges, so that the current value (and the temperature) may be substantially increased. However, the pulse width modulation helps to mitigate the effect of this high increase.

In some particular embodiments, the step of increasing the current value involves increasing the current value to an increased current value, the increased current value being the minimum possible which produces a color which satisfies the allowance condition.

The increased current value is kept as low as possible, within the acceptable color range. Hence, the impact of this increase is kept as minimum as possible, and will be fixed by the pulse width modulation.

In some particular embodiments, the step of increasing the current value further comprises the step of keeping the increased current value constant while performing more than one values of pulse width modulation.

The dynamic control of the current value and the color allowance is performed by the pulse width modulation, instead of by further changes in the current value.

In some particular embodiments, the method further comprises the step of recording a sequence of current value increments for each of predetermined temperature conditions, wherein the increased or decreased current value is based on the recorded sequence of current value increments depending on the measured or estimated temperature.

This sequence may be useful if using a time-based pattern, to avoid a continuous temperature measurement.

In some particular embodiments, the steps of the method are applied to at least 10% of the solid-state light sources of the lighting device.

The progressive increase in the current value may be applied to a great number of light sources at the same time, for example, all the light sources providing a predetermined functionality. The power saving and homogeneous performance may therefore be applied to a great amount of elements.

In some embodiments, the automotive lighting device comprises at least two solid-state light modules, a first solid state light module comprises a first solid-state light source and a second solid-state light module comprises a second solid-state light source. The method further comprises:

- defining a homogeneity criterion, for which a pair of colors emitted by the first light module and the second light module is defined to be acceptable or not acceptable,
- feeding the first light module with a first current value which produces a luminous flux value comprised between the minimum luminous flux threshold value and the maximum luminous flux threshold value;
- feeding the second light module with a second current value which produces a luminous flux value comprised between the minimum luminous flux threshold value and the maximum luminous flux threshold value,
- measuring or estimating the temperatures in the first light module and in the second light module;
- obtaining the color of the light emitted by the first light module based on the measured or estimated temperature in the first light module and on the first current value, and the color of the light emitted by the second light module based on the measured or estimated temperature in the second light module and on the second current value,
- checking whether the color of the light emitted by the first light module satisfies the allowance condition, whether the color of the light emitted by the second light module satisfies the allowance condition and whether the pair of colors emitted by the first light module and the second light module satisfies the homogeneity criterion;
- if the color of the light emitted by the first light module fails to satisfy the allowance condition, if the color of the light emitted by the second light module fails to satisfy the allowance condition, or if the pair of colors emitted by the first light module and the second light module fails to satisfy the homogeneity criterion, increasing or decreasing the first current value and/or the second current value, so that the light produced by the first light module and by the second light module satisfy the allowance condition and the homogeneity criterion;
- if the increased or decreased first or second current value produces a luminous flux value below the minimum luminous flux threshold value or above the maximum luminous flux threshold value, perform a pulse width modulation of the first or second current value to produce a luminous flux value comprised between the minimum luminous flux threshold value and the maximum flux threshold value.

The homogeneity criterion is defined as the similarity between a pair of output colors. It may be defined, for instance, in terms of RGB ranges or in terms of a distance in a color diagram, for example in a chromaticity diagram of the CIE color space, but any definition of a skilled technician will be part of the scope of this invention.

By means of this method, the lighting device is able to calculate if the output colors respect both the homogeneity criterion and the allowance condition and that the luminous flux value is between the minimum luminous flux threshold value and the maximum flux threshold value.

Indeed, a lighting device may comprise several solid-state light modules, the solid-state light modules contributing to an output pattern of the light device. When the solid-state light modules have different temperatures, color may not be homogeneous in the whole pattern. Definition of the homogeneity criterion enables to overcome this problem.

Based on this method, an active control of the current values of both light modules is carried out, thus allowing different current strategies for each solid-state light module, depending on the temperature evolution registered for each one of them.

In complement, the increased current value of the first and/or second light module is calculated from a datasheet and/or experimental data using color and temperature as input values.

There are many alternative ways of obtaining the output color of the solid-state light sources. Sometimes, manufacturer's datasheets provide reliable and useful information about these parameters, but experimental data may also be used to obtain this allowance condition.

According to embodiments, the first current value is increased and the first increased current value is calculated from the data obtained from the first solid-state light module, and the second current value is calculated based on the color output by the first solid-state light module and the homogeneity criterion.

In this case, the first solid-state light module leads the method and the second solid-state light module has a slave configuration to ensure color homogeneity of the output pattern of the light device.

Still in complement, the step of increasing or decreasing the first or second current value comprises defining first the increased or decreased current value of the light module with a higher temperature and then, defining the increased or decreased current value of the light module with a lower temperature.

Therefore, the module with a higher temperature may increase or decrease its current value and the module may increase or decrease its current value to meet the homogeneity criterion. Each light module may follow its own strategy, which may be different in actions (increase or decrease) and/or in times (one current value may remain constant while the other one increases or decreases).

The decision of which module should increase or decrease its current value is, in some embodiments, provided by a LED driver of the whole lighting device, so that the decision is coordinated and to avoid any conflict.

According to some embodiments, the method further comprises the step of recording a sequence of current value increments for each of predetermined temperature conditions, the increased or decreased first or second current value being based on the recorded sequence of current value increments depending on the measured or estimated temperatures in the first light module and in the second light module.

This sequence may be useful if using a time-based pattern, to avoid a continuous temperature measurement.

According to some embodiments, at least some of the steps of the method are carried out by a control unit which is configured to estimate a temporal pattern for the first and second current values provided to the first and second light modules by training the control unit to estimate a current value for first and/or second light modules with a training dataset; and testing the control unit with real current values.

The control unit may undergo an artificial intelligence strategy to foresee the most suitable evolution of the first and second current. To do so, the control unit is trained with a training dataset which may comprise different inputs: current of other modules, external conditions, vehicle speed, driver's decisions. . . . With these values, the control unit is trained to foresee the best evolution of the first and second current values.

In a second inventive aspect, the invention provides a computer program comprising instructions which, when the program is executed by a control unit, cause the control unit to carry out the steps of a method according to any of claims 1 to 14.

In a third inventive aspect, the invention provides an automotive lighting device comprising:

a matrix arrangement of solid-state light sources;

a control element for performing the steps of the method according to the first inventive aspect.

This lighting device provides the advantageous functionality of efficiently managing the color performance of the light sources.

In some embodiments, the automotive lighting device comprises at least two second solid-state light module, a first solid state light module comprises a first solid-state light source and a second solid-state light module comprises a second solid-state light source, wherein the control element is configured to perform the steps of the method according to some embodiments of the first aspect of the invention.

In some particular embodiments, the matrix arrangement comprises at least 2000 solid-state light sources.

A matrix arrangement is a typical example for this method. The rows may be grouped in projecting distance ranges and each column of each group represent an angle interval. This angle value depends on the resolution of the matrix arrangement, which is typically comprised between 0.01° per column and 0.5° per column. As a consequence, many light sources may be managed at the same time.

DETAILED DESCRIPTION OF THE INVENTION

Figure 1:
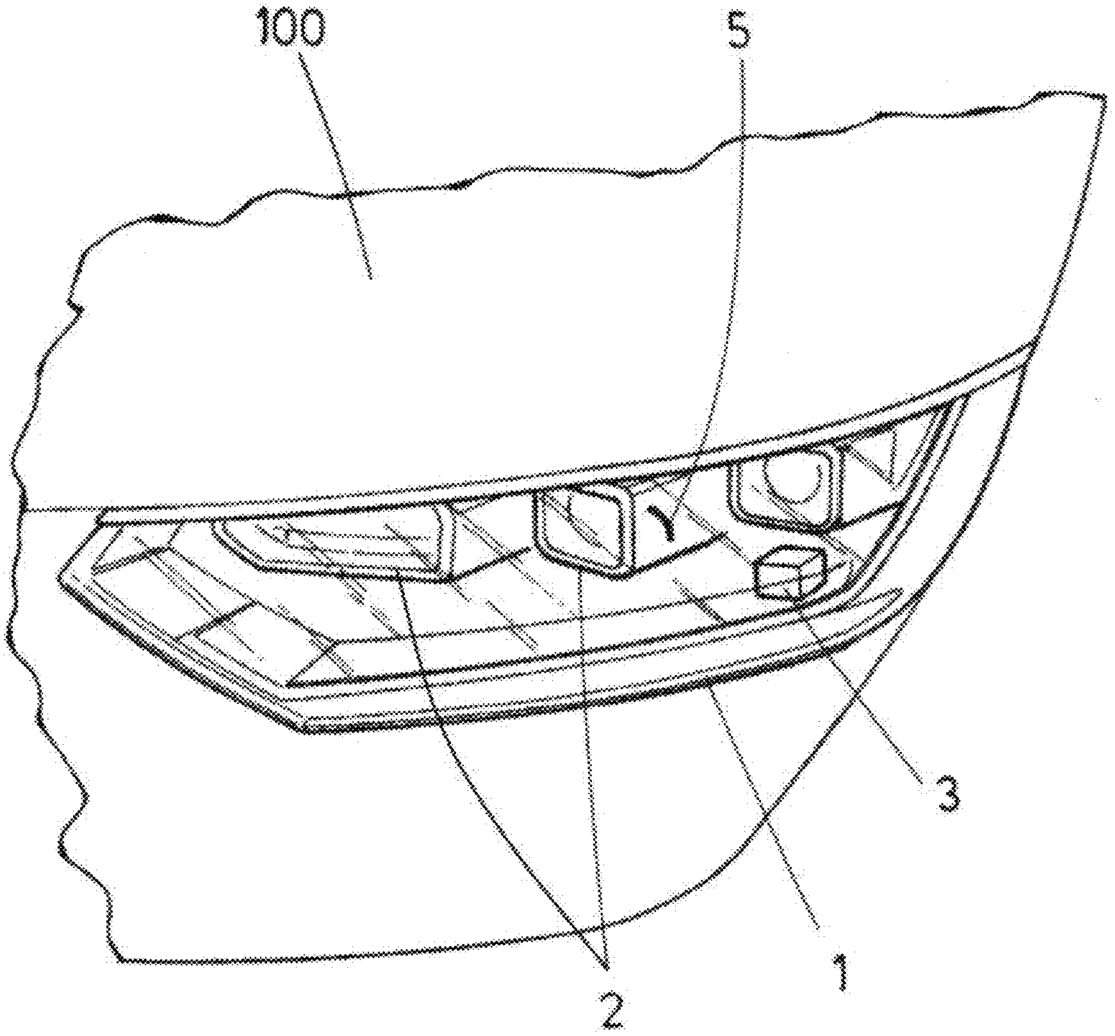
FIG. 1 shows a general perspective view of an automotive lighting device according to the invention.

In these figures, the following reference numbers have been used:

1 Lighting device
2 Light module
3 Control element
**4*a*** Minimum luminous flux threshold value
**41*a*** Current value
**42*a*** Increased/decreased current value
5 Thermistor
**6*a*** Non-allowance dots
**7*a*** Maximum luminous flux threshold value
100 Automotive vehicle The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a general perspective view of an automotive lighting device according to the invention.

This lighting device 1 is installed in an automotive vehicle 100 and comprises

- a matrix arrangement forming at least one solid-state light source, intended to provide a light pattern. As shown on FIG. 1, the matrix arrangement may comprise two light modules 2 intended to provide a light pattern. Each light module may comprise a solid-state light source;
- a control element 3 to perform a thermal control of the operation of the LEDs 2; and
- a thermistor 5 intended to measure the temperature in the LEDs. The thermistor may be intended to measure the temperature in the light modules 2.

This matrix configuration is a high-resolution module, having a resolution greater than 2000 pixels. However, no restriction is attached to the technology used for producing the projection modules.

A first example of this matrix configuration comprises a monolithic source. This monolithic source comprises a matrix of monolithic electroluminescent elements arranged in several columns by several rows. In a monolithic matrix, the electroluminescent elements can be grown from a common substrate and are electrically connected to be selectively activatable either individually or by a subset of electroluminescent elements. The substrate may be predominantly made of a semiconductor material. The substrate may comprise one or more other materials, for example non-semiconductors (metals and insulators). Thus, each electroluminescent element/group can form a light pixel and can therefore emit light when its/their material is supplied with electricity. The configuration of such a monolithic matrix allows the arrangement of selectively activatable pixels very close to each other, compared to conventional light-emitting diodes intended to be soldered to printed circuit boards. The monolithic matrix may comprise electroluminescent elements whose main dimension of height, measured perpendicularly to the common substrate, is substantially equal to one micrometre.

The monolithic matrix is coupled to the control center so as to control the generation and/or the projection of a pixelated light beam by the matrix arrangement. The control center is thus able to individually control the light emission of each pixel of the matrix arrangement. The control center is also called LED driver.

Alternatively to what has been presented above, the matrix arrangement may comprise a main light source coupled to a matrix of mirrors. Thus, the pixelated light source is formed by the assembly of at least one main light source formed of at least one light emitting diode emitting light and an array of optoelectronic elements, for example a matrix of micro-mirrors, also known by the acronym DMD, for "Digital Micro-mirror Device", which directs the light rays from the main light source by reflection to a projection optical element. Where appropriate, an auxiliary optical element can collect the rays of at least one light source to focus and direct them to the surface of the micro-mirror array.

Each micro-mirror can pivot between two fixed positions, a first position in which the light rays are reflected towards the projection optical element, and a second position in which the light rays are reflected in a different direction from the projection optical element. The two fixed positions are oriented in the same manner for all the micro-mirrors and form, with respect to a reference plane supporting the matrix of micro-mirrors, a characteristic angle of the matrix of micro-mirrors defined in its specifications. Such an angle is generally less than 20° and may be usually about 12°. Thus, each micro-mirror reflecting a part of the light beams which are incident on the matrix of micro-mirrors forms an elementary emitter of the pixelated light source. The actuation and control of the change of position of the mirrors for selectively activating this elementary emitter to emit or not an elementary light beam is controlled by the control center.

In different embodiments, the matrix arrangement may comprise a scanning laser system wherein a laser light source emits a laser beam towards a scanning element which is configured to explore the surface of a wavelength converter with the laser beam. An image of this surface is captured by the projection optical element.

The exploration of the scanning element may be performed at a speed sufficiently high so that the human eye does not perceive any displacement in the projected image.

The synchronized control of the ignition of the laser source and the scanning movement of the beam makes it possible to generate a matrix of elementary emitters that can be activated selectively at the surface of the wavelength converter element. The scanning means may be a mobile micro-mirror for scanning the surface of the wavelength converter element by reflection of the laser beam. The micro-mirrors mentioned as scanning means are for example MEMS type, for "Micro-Electro-Mechanical Systems". However, the invention is not limited to such a scanning means and can use other kinds of scanning means, such as a series of mirrors arranged on a rotating element, the rotation of the element causing a scanning of the transmission surface by the laser beam.

In another variant, the light source may be complex and include both at least one segment of light elements, such as light emitting diodes, and a surface portion of a monolithic light source.

Figure 2:
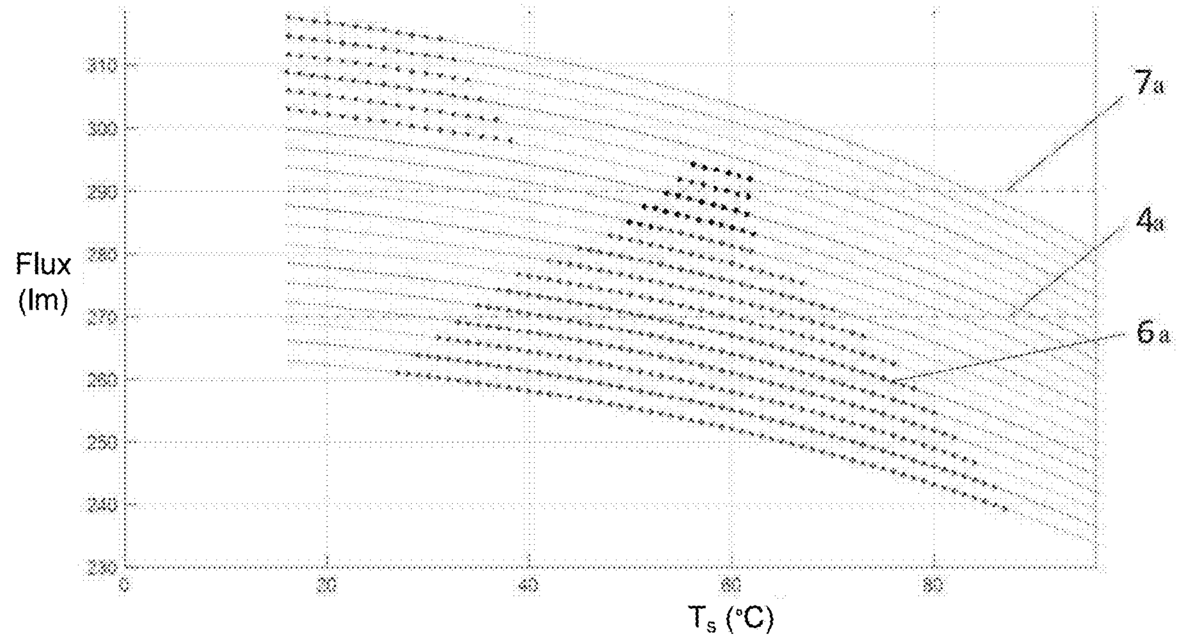
FIG. 2 shows a graphic scheme which represents the luminous flux values produced by the solid-state light source when fed by a particular electric current value and is under a particular temperature, according to the first embodiment of the invention.
Figure 3:
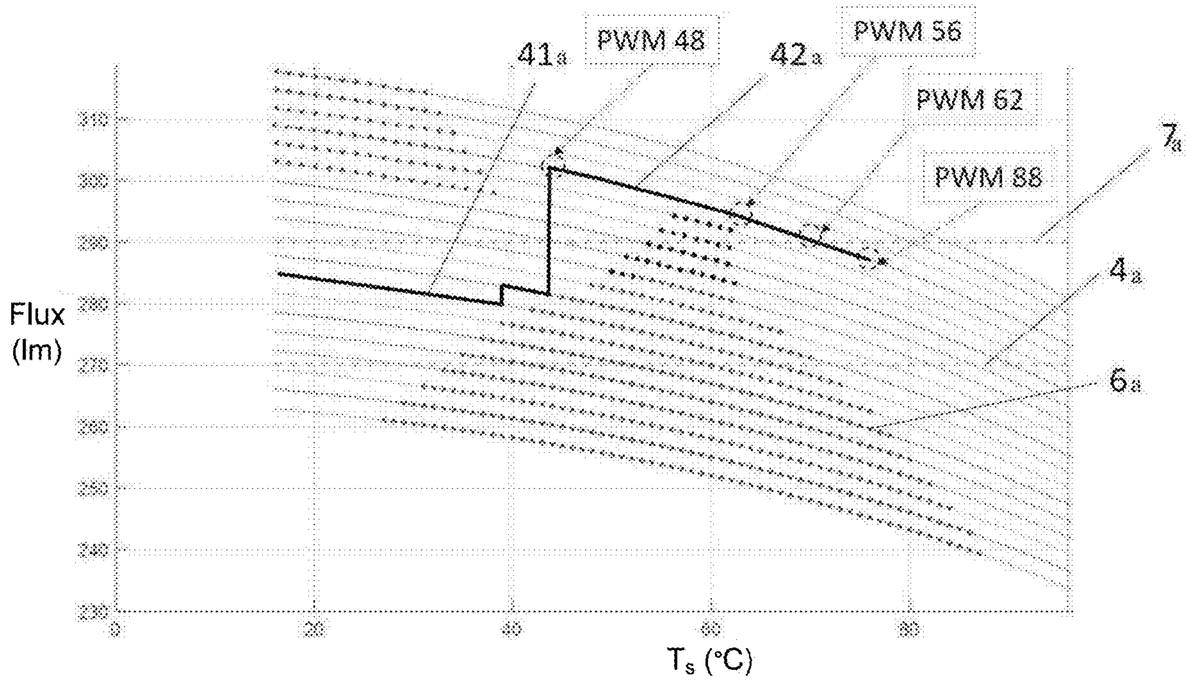
FIG. 3 shows an example of the evolution of the electric current in the solid-state light source in a method according to the first embodiment of the invention.

FIGS. 2 and 3 describe a first embodiment where the invention applies to a matrix arrangement in one solid-state light module 2, whereas FIGS. 4, 5, 6, 7 and 8 describe a second embodiment where the invention applies to a light device with two solid-state light modules 2.

FIG. 2 shows a graphic scheme which represents the luminous flux values produced by the solid-state light source when fed by a particular electric current value and is under a particular temperature. Further, some non-allowance dots 6*a* have been added to this graph. The dots 6*a* represent combinations of current values and temperature which provide a color which is not accepted by some automotive regulations.

In this graph, a minimum luminous flux threshold value 4*a* and a maximum flux threshold value 7*a* are also represented.

In this particular embodiment of the method according to the invention, the operation of the light source is controlled under some premises.

First one is that luminous flux should be kept between the minimum luminous flux threshold value 4*a* and the maximum luminous flux threshold value 7*a*.

Second one is that the output color should fulfil the allowance condition, i.e., be kept out from the non-allowance dots 6*a* represented in the graph.

This performance is controlled by the electrical current value which is provided to the solid-state light source. The variation in the electrical current value causes a variation of the luminous flux and a variation of the output color.

Hence, small variations are to be used, to provide an accepted performance in terms of color and luminous flux.

FIG. 3 shows an example of the evolution of the current value in the solid-state light source in a method according to the first embodiment of the invention.

Firstly, when the temperature in the LED is still low, a current value 41*a* is chosen, which is closer to the maximum threshold 7*a* than to the minimum threshold 4.*a* This current value 41*a*, paired with the temperature provides an output color which is also allowed, far from the non-allowance dots 6*a* represented in the graph.

While time passes, temperature increases, and the initial current value 41*a* provides a luminous flux which, although is still within the allowed values, is lower than the initial luminous flux. Temperature is increased until a zone where none of the available current values provide a color which is allowed (all the current values lines have non-allowance dots 6*a*). The only way of obtaining a color which is allowed is increasing the current value to an increased current value 42*a*, more than 1.2 times the initial current value 41*a*, over the maximum luminous flux threshold 7*a*.

However, this increased current value would make the light sources emit a luminous flux which is over the regulations. This fact is compensated by performing a pulse width modulation on the current provided to the light sources. While the pulse width modulation value is at 90% in the initial current value, this pulse width modulation value is modified to 48% when the current value is increased to the increased current value, to keep the average current value within the allowed region, the color not being affected.

When the temperature increases and the luminous flux should be increased to compensate the rising temperature, the current value is kept constant, and the pulse width modulation value is progressively modified from 48% to 56%, to 62% and to 88% for a dynamic control of the luminous flux, the color and the temperature.

Figure 4:
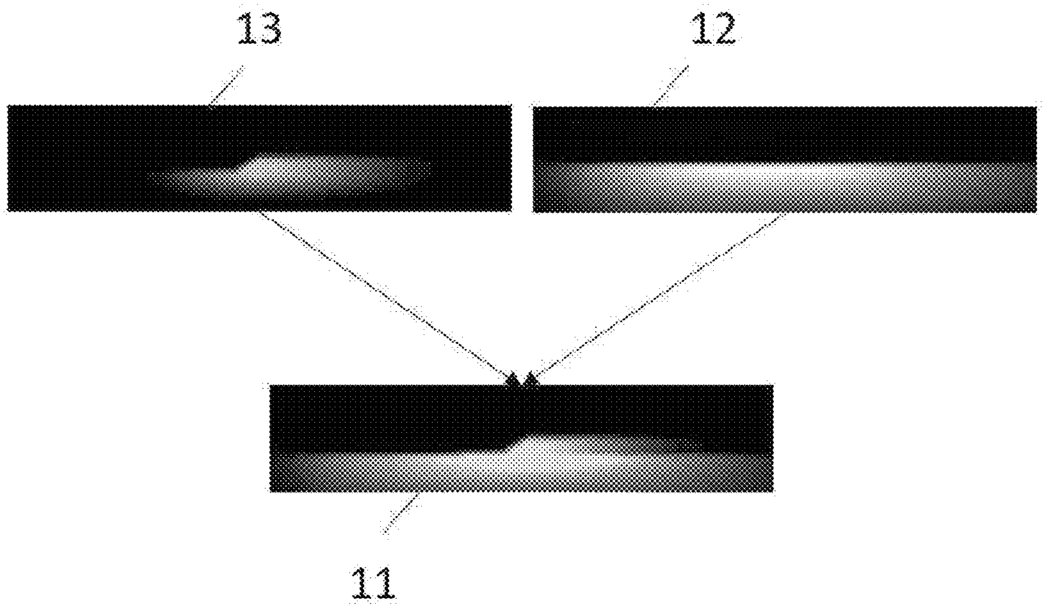
FIG. 4 shows a scheme where a light pattern is described to be comprised of the projection of two different light modules, according to the second embodiment of the invention.

FIG. 4 shows a scheme where a light pattern is described to be comprised of the projection of two different light modules 2, named first and second light modules, according to the second embodiment of the invention.

In this example, which corresponds to a low beam pattern, the complete projection 11 may be divided into a first portion 12 and a second portion 13. In this particular pattern, the first portion 12 is usually called "flat" and the second portion 13 is usually called "kink". The first portion 12, or the "flat" portion, presents a low-beam pattern with a flat cut-off line. The second portion 13, or the "kink" portion, is having a characteristic elbow of a low beam. The first light module is in charge of projecting the "flat" 12 and the second light module is in charge of projecting the kink "13".

Since both portions 12, 13 are intended to form a unique pattern 11, it is important that the output colors of these light modules are as similar as possible.

Figure 5:
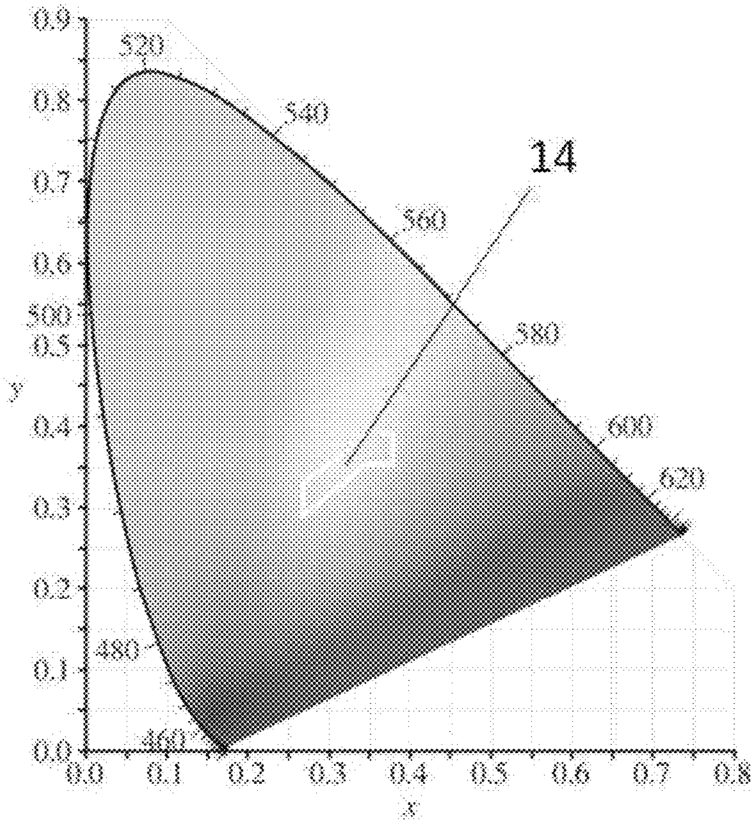
FIG. 5 shows a graphic representation which is a chromaticity diagram of the CIE color space, where the homogeneity criterion is that the pair of output colors are contained in the "white zone", according the second embodiment of the invention.

A homogeneity criterion is defined by the manufacturer, in terms for example of a range within the RGB pattern, or distance in a color representation, such as the one of FIG. 5.

FIG. 5 shows a color graphic representation which is a chromaticity diagram of the CIE color space, where the homogeneity criterion is that the pair of output colors are contained in the "white zone" 14. This is an example of criterion, although the skilled technician could establish any similar one.

For example, another homogeneity criterion may be that the distance in the color graphic representation of the colors of the pair of output colors is lower than a predefined distance.

Figure 6:
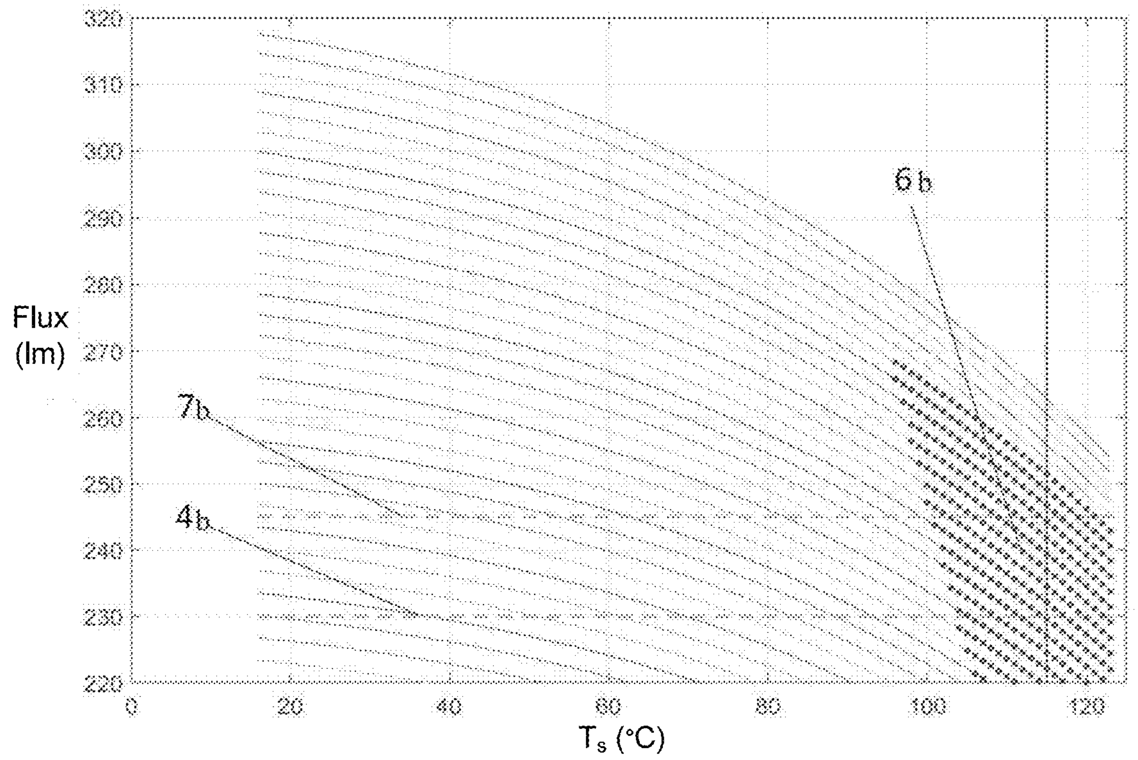
FIG. 6 shows a graphic scheme which represents the luminous flux produced by the solid-state source of one of the light modules when fed by a particular electric current value and is under a particular temperature, according the second embodiment of the invention.

FIG. 6 shows a graphic scheme which represents the luminous flux produced by the solid-state source of one of the light modules 2 when fed by a particular electric current value and is under a particular temperature. Further, some non-allowance dots 6*b* have been added to this graph. The dots 6*b* represent combinations of current value and temperature which provide a color which fails to satisfy the allowance condition.

In this graph, a minimum luminous flux threshold value 4*b* and a maximum flux threshold value 7*b* are also represented.

In the second embodiment of the method according to the invention, the operation of the solid-state light sources of the two light modules 2 is controlled under some premises.

First one is that luminous flux should be kept between the minimum luminous flux threshold value 4*b* and the maximum luminous flux threshold value 7*b*.

Second one is that the output color of the first light module and the output color of the second light module satisfy the allowance condition, i.e. are kept out from the non-allowance dots 6*a* represented in the graph.

Third one is that the pair of colors output by the first light module and the second light module satisfies the homogeneity criterion.

This performance is controlled by the electrical current values provided to the first solid-state light source of the first light module and to the second solid-state light source of the second light module. The variation in the electrical current values causes a variation of the luminous flux and a variation of the output colors.

Hence, small variations are to be used, to provide an accepted performance in terms of color and luminous flux.

Several options may be used to achieve this goal.

In a first option, the first light module is fed with an electrical current value which is comprised between the thresholds 4*b*, 7*b* of FIG. 6. Then, the first color output by the first module is determined, using theoretical and experimental data, and a second current value is chosen to feed the second module to obtain the same color as the first output color, or at least to satisfy the homogeneity criterion.

In a second option, a color is chosen for both the first and second modules 2, from the graphic of FIG. 5. Using the theoretical and experimental data of each light module, a first current value and a second current value are obtained to provide first and second output colors which are similar to the chosen one, and which satisfy the homogeneity criterion.

However, in some situations, to avoid non-allowance dots 6*b* or for any other reasons, at least one of the current values need to be increased above the maximum flux threshold value 7*b* or decreased below the minimum flux threshold value 4*b*. This situation is illustrated on FIG. 7.

Figure 7:
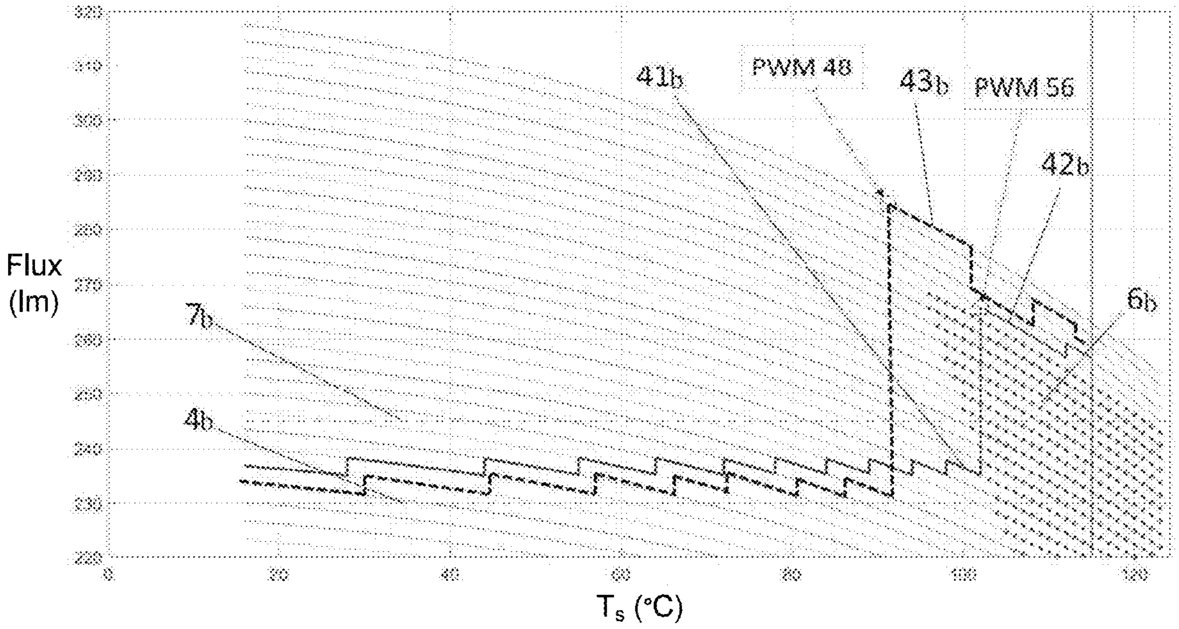
FIG. 7 shows an example of the temporal evolution of the electric currents in the first and second light modules, according to the second embodiment of the invention.

FIG. 7 shows an example of the temporal evolution of the electric currents in the first and second light modules 2, according to the second embodiment of the invention. A first current value 41*b* is chosen between the threshold values 4*b* and 7*b* to feed the first light module 2. Then, when the control unit decided that there is a reason to increase the electric current (to avoid non-allowance dots 6*b* when the temperature increases or because any other reasons), the first current value is increased to an increased first current value, so that the first color output by the first module satisfies the allowance condition. However, the first current value may also be decreased to a decreased first current value so that the first color output by the second module satisfies the allowance condition.

The control unit may be designed to decide which is the best option, among increasing or decreasing the first current value, unless one of the options are taken as provided by the car manufacturers and how should these current values be managed.

In the second embodiment, the control unit may merely compare the temperatures of the first and second light modules 2 and provide a more flexible scenario for the light module with a higher temperature.

To do so, the control unit may be trained in artificial intelligence algorithms, using the data provided by external sensors.

In a first process, the control unit is trained. To do so, a map as the one of FIG. 6 is provided for each light module, so that the boundary conditions are clearly established.

Then, data is provided from external sensors, with module temperatures, module current values, external temperature, vehicle speed, driver's settings, and so on. The control unit uses these data to obtain the optimal first and second current values at each moment, and these results are tested with values provided by the manufacturer. When this training-testing process is finished, the control unit is ready to be installed in the automotive lighting device and control the current values of the two light modules.

Back to the evolution of FIG. 7, the first module is fed with a first current value 41*b* and the second module is fed with a second current value 43*b*. The temperature of the first light module 2 and the temperature of the second light module 2 are measured or estimated. Based on these temperatures and current values, it is determined:

whether the first color output by the first module satisfies the allowance condition;

the second color output by the second module satisfies the allowance condition; and the pair of first and second colors satisfy the homogeneity criterion.

In the example of FIG. 7, due to a temperature increase in the first module, the first current value of the first light module, shown in continuous lines, is increased from a first value 41*b* to an increased first value 42*b*, higher than 1.2 times the first value, to satisfy the allowance condition. This substantial increase is due to the fact that there is a non-allowable zone which covers the whole range between the flux threshold 4*b* and 7*b*, for some temperatures reached by the first module 2. Since the luminous flux caused by this high current value is higher than the maximum luminous flux threshold 7*b*, a pulse width modulation is performed on the increased first current provided to the first light module, so that the luminous flux of the first light module 2 is within the threshold values 4*b* and 7*b*. In this example, the PWM value is set as 56%.

The second current value 43*b* fed to the second light module follows a different pattern shown in the dashed line. Once the first current value is increased to the increased current value 42*b*, the second current value 43*b* also needs to be increased so that the first and second colors satisfy the homogeneity criterion. Thus, the second light module 2 also receives an increased current value but, due to the fact that this second light module has a lower temperature, the current value is increased to an increased second current value 43*b* that is higher than the increased first current value to satisfy the homogeneity criterion. The increased second current value 43*b* is also outside the threshold values 4*b* and 7*b*. As a consequence, a pulse width modulation is also performed on the second current value provided to this second light module 2, so that the luminous flux is within the threshold values 4*b* and 7*b*. In this example, the PWM value for the increased second current value 43*b* is set as 48%.

The future evolution of these first and second current values is different, the second light module yielding, so that the first light module, which has a higher temperature, has more flexibility to modify the first current value, for a better control of the temperature, while homogeneity, color allowability and flux threshold criteria are met.

What is claimed is:

1. A method for operating an automotive lighting device comprising at least one solid-state light source, comprising:

defining a color allowance condition, wherein for each pair temperature-electrical current, a color is defined to be acceptable or not acceptable;

establishing a minimum luminous flux threshold value and a maximum luminous flux threshold value;

feeding the solid-state light source with a current value which produces a luminous flux value comprised between the minimum luminous flux threshold value and the maximum luminous flux threshold value;

measuring or estimating a temperature in the solid-state light source;

obtaining the color of the light emitted by the solid-state light source based on the measured or estimated temperature and on the current value fed to the light source;

checking whether the obtained color satisfies the allowance condition;

if the obtained color fails to satisfy the allowance condition, increasing or decreasing the current value to produce a color which satisfies the allowance condition; and if the increased or decreased current value produces a luminous flux value below the minimum luminous flux threshold value or above the maximum luminous flux threshold value, perform a pulse width modulation of the current value to produce a luminous flux value comprised between the minimum luminous flux threshold value and the maximum flux threshold value.

2. The method according to claim 1, wherein obtaining the color is carried out using a datasheet and/or experimental data, which provides the color from the temperature and the current value.

3. The method according to claim 1, wherein increasing the current value involves increasing the current value to an increased current value higher than 1.2 times the current value.

4. The method according to claim 1, wherein increasing the current value involves increasing the current value to the minimum possible increased current value which produces a color which satisfies the allowance condition.

5. The method according to claim 4, wherein increasing the current value includes keeping the increased current value constant while performing more than one values of pulse width modulation.

6. The method according to claim 1, further comprising recording a sequence of current value increments for each of predetermined temperature conditions, wherein the increased or decreased current value is based on the recorded sequence of current value increments depending on the measured or estimated temperature.

7. The method according to claim 1, wherein the method is applied to at least 10% of the light sources of the lighting device.

8. The method according to claim 1, wherein the automotive lighting device includes at least two second solid-state light module, wherein a first solid state light module includes a first solid-state light source and a second solid-state light module includes a second solid-state light source, wherein the method further comprises:

defining a homogeneity criterion, for which a pair of colors emitted by the first light module and the second light module is defined to be acceptable or not acceptable, feeding the first light module with a first current value which produces a luminous flux value comprised between the minimum luminous flux threshold value and the maximum luminous flux threshold value;

feeding the second light module with a second current value which produces a luminous flux value comprised between the minimum luminous flux threshold value and the maximum luminous flux threshold value, measuring or estimating the temperatures in the first light module and in the second light module;

obtaining the color of the light emitted by the first light module based on the measured or estimated temperature in the first light module and on the first current value, and the color of the light emitted by the second light module based on the measured or estimated temperature in the second light module and on the second current value, checking whether the color of the light emitted by the first light module satisfies the allowance condition, whether the color of the light emitted by the second light module satisfies the allowance condition and whether the pair of colors emitted by the first light module and the second light module satisfies the homogeneity criterion;

if the color of the light emitted by the first light module fails to satisfy the allowance condition, if the color of the light emitted by the second light module fails to satisfy the allowance condition or if the pair of colors emitted by the first light module and the second light module fails to satisfy the homogeneity criterion, increasing or decreasing the first current value and/or the second current value, so that the light produced by the first light module and by the second light module satisfies the allowance condition and the homogeneity criterion; and if the increased or decreased first or second current value (produces a luminous flux value below the minimum luminous flux threshold value or above the maximum luminous flux threshold value, perform a pulse width modulation of the first or second current value to produce a luminous flux value comprised between the minimum luminous flux threshold value and the maximum flux threshold value.

9. The method according to claim 8, wherein the increased current value of the first and/or second light module is calculated from a datasheet and/or experimental data using color and temperature as input values.

10. The method according to claim 8, wherein the first current value is increased and the first increased current value is calculated from the data obtained from the first solid-state light module, and the second current value is calculated based on the color output by the first solid-state light module and the homogeneity criterion.

11. The method according to claim 8, wherein increasing or decreasing the first or second current value includes defining first the increased or decreased current value of the light module with a higher temperature and then, defining the increased or decreased current value of the light module with a lower temperature.

12. The method according to claim 8, further comprising recording a sequence of current value increments for each of predetermined temperature conditions, wherein the increased or decreased first or second current value is based on the recorded sequence of current value increments depending on the measured or estimated temperatures in the first light module and in the second light module.

13. The method according to claim 8, wherein at least some of the method is carried out by a control unit which is configured to estimate a temporal pattern for the first and second current values provided to the first and second light modules by training the control unit to estimate a current value for first and/or second light modules with a training dataset; and testing the control unit with real current values.

14. A computer program includes instructions which, when the program is executed by a control unit, cause the control unit to carry out a method, comprising:

defining a color allowance condition, wherein for each pair temperature-electrical current, a color is defined to be acceptable or not acceptable;

establishing a minimum luminous flux threshold value and a maximum luminous flux threshold value;

feeding the solid-state light source with a current value which produces a luminous flux value comprised between the minimum luminous flux threshold value and the maximum luminous flux threshold value;

measuring or estimating a temperature in the solid-state light source;

obtaining the color of the light emitted by the solid-state light source based on the measured or estimated temperature and on the current value fed to the light source;

checking whether the obtained color satisfies the allowance condition;

if the obtained color fails to satisfy the allowance condition, increasing or decreasing the current value to produce a color which satisfies the allowance condition; and if the increased or decreased current value produces a luminous flux value below the minimum luminous flux threshold value or above the maximum luminous flux threshold value, perform a pulse width modulation of the current value to produce a luminous flux value comprised between the minimum luminous flux threshold value and the maximum flux threshold value.

15. Automotive lighting device comprising:

a matrix arrangement of solid-state light sources;

a control element configured to:

define a color allowance condition, wherein for each pair temperature-electrical current, a color is defined to be acceptable or not acceptable;

establish a minimum luminous flux threshold value and a maximum luminous flux threshold value;

feed the solid-state light source with a current value which produces a luminous flux value comprised between the minimum luminous flux threshold value and the maximum luminous flux threshold value;

measure or estimate a temperature in the solid-state light source;

obtain the color of the light emitted by the solid-state light source based on the measured or estimated temperature and on the current value fed to the light source;

check whether the obtained color satisfies the allowance condition;

if the obtained color fails to satisfy the allowance condition, increasing or decreasing the current value to produce a color which satisfies the allowance condition; and if the increased or decreased current value produces a luminous flux value below the minimum luminous flux threshold value or above the maximum luminous flux threshold value, perform a pulse width modulation of the current value to produce a luminous flux value comprised between the minimum luminous flux threshold value and the maximum flux threshold value.

16. The automotive lighting device according to claim 15, further comprising at least two second solid-state light module, wherein a first solid state light module includes a first solid-state light source and a second solid-state light module includes a second solid-state light source, wherein the control element is configured to:

define a homogeneity criterion, for which a pair of colors emitted by the first light module and the second light module is defined to be acceptable or not acceptable, feed the first light module with a first current value which produces a luminous flux value comprised between the minimum luminous flux threshold value and the maximum luminous flux threshold value;

feed the second light module with a second current value which produces a luminous flux value comprised between the minimum luminous flux threshold value and the maximum luminous flux threshold value, measure or estimating the temperatures in the first light module and in the second light module;

obtain the color of the light emitted by the first light module based on the measured or estimated temperature in the first light module and on the first current value, and the color of the light emitted by the second light module based on the measured or estimated temperature in the second light module and on the second current value, check whether the color of the light emitted by the first light module satisfies the allowance condition, whether the color of the light emitted by the second light module satisfies the allowance condition and whether the pair of colors emitted by the first light module and the second light module satisfies the homogeneity criterion;

if the color of the light emitted by the first light module fails to satisfy the allowance condition, if the color of the light emitted by the second light module fails to satisfy the allowance condition or if the pair of colors emitted by the first light module and the second light module fails to satisfy the homogeneity criterion, increasing or decreasing the first current value and/or the second current value, so that the light produced by the first light module and by the second light module satisfies the allowance condition and the homogeneity criterion; and if the increased or decreased first or second current value (produces a luminous flux value below the minimum luminous flux threshold value or above the maximum luminous flux threshold value, perform a pulse width modulation of the first or second current value to produce a luminous flux value comprised between the minimum luminous flux threshold value and the maximum flux threshold value.

* * * * *